(12) United States Patent
Ono (10) Patent No.: US 12,183,934 B2
(45) Date of Patent: Dec. 31, 2024

(54) STACKED ELECTRODE BODY, RESIN-FIXED STACKED ELECTRODE BODY, AND ALL-SOLID-STATE BATTERY

(71) Applicant: TOYOTA JIDOSHA KABUSHIKI KAISHA, Toyota (JP)

(72) Inventor: Masato Ono, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 17/539,407

(22) Filed: Dec. 1, 2021

(65) Prior Publication Data

US 2022/0247021 A1    Aug. 4, 2022

(30) Foreign Application Priority Data

Jan. 29, 2021   (JP) .................................. 2021-013488

(51) Int. Cl.
*H01M 10/00*       (2006.01)
*H01M 10/0585*   (2010.01)
*H01M 50/184*     (2021.01)
*H01M 50/186*     (2021.01)
*H01M 50/193*     (2021.01)

(52) U.S. Cl.
CPC ..... *H01M 50/186* (2021.01); *H01M 10/0585* (2013.01); *H01M 50/184* (2021.01); *H01M 50/193* (2021.01)

(58) Field of Classification Search
CPC ........... H01M 50/186; H01M 10/0585; H01M 50/184; H01M 50/193; H01M 10/0525; H01M 2300/0085; H01M 10/052; H01M 10/0562

See application file for complete search history.

(56) References Cited

U.S. PATENT DOCUMENTS

| | | | |
|---|---|---|---|
| 10,957,944 B2* | 3/2021 | Han | ................. H01M 10/0585 |
| 2005/0141170 A1 | 6/2005 | Honda et al. | |
| 2010/0221595 A1 | 9/2010 | Murata | |
| 2014/0027643 A1 | 1/2014 | Aramaki et al. | |
| 2015/0255827 A1 | 9/2015 | Matsushita et al. | |
| 2017/0352923 A1 | 12/2017 | Iwano et al. | |
| 2018/0212210 A1* | 7/2018 | Suzuki | ................. H01M 50/119 |
| 2020/0259128 A1 | 8/2020 | Tanaka et al. | |
| 2021/0320323 A1* | 10/2021 | Chandra | ........... H01M 10/0585 |

(Continued)

FOREIGN PATENT DOCUMENTS

| | | | |
|---|---|---|---|
| JP | 2003282142 A | 10/2003 | |
| JP | 2005071784 A | 3/2005 | |
| JP | 2008108477 A | 5/2008 | |

(Continued)

*Primary Examiner* — Nicholas P D'Aniello
(74) *Attorney, Agent, or Firm* — Dickinson Wright, PLLC (57) ABSTRACT

Provided is a stacked electrode body the whole of which can be checked for misregistration. A stacked electrode body for an all-solid-state battery includes a plurality of electrode bodies that are stacked and each includes a first electrode, a solid electrolyte layer, a second electrode, and a second current collector which are disposed on each of both surfaces of a first current collector in this order, wherein each of the electrode bodies has a protrusion protruding outward from a side face thereof, and the protrusions have phase differences in a stacking direction.

3 Claims, 5 Drawing Sheets

(56) References Cited

U.S. PATENT DOCUMENTS

2021/0384550 A1\* 12/2021 Kumagae ............ H01M 50/533

FOREIGN PATENT DOCUMENTS

| | | | |
|---|---|---|---|
| JP | 2012227131 | A | 11/2012 |
| JP | 2015167117 | A | 9/2015 |
| JP | 2015207457 | A | 11/2015 |
| JP | 2017220447 | A | 12/2017 |
| KR | 10-2017-0136433 | A | 12/2017 |
| KR | 10-2019-0054419 | A | 5/2019 |
| KR | 10-2020-0098405 | A | 8/2020 |

\* cited by examiner

STACKED ELECTRODE BODY, RESIN-FIXED STACKED ELECTRODE BODY, AND ALL-SOLID-STATE BATTERY

FIELD

The present application relates to a stacked electrode body, a resin-fixed stacked electrode body, and an all-solid-state battery.

BACKGROUND

An all-solid-state battery that is safer than an aqueous battery has been developed in recent years. The all-solid-state battery is manufactured as a result of layering a cathode current collector, a cathode, a solid electrolyte layer, an anode, and an anode current collector. Misregistration may occur when these components are layered, which is problematic. The following techniques are disclosed to deal with such a problem.

Patent Literature 1 discloses an electrode position detection device capable of detecting positions of a packaged electrode and another electrode when the packaged electrode and the other electrode are layered. Patent Literature 2 discloses an electrode device capable of layering an electrode on a layered electrode body without generating dents on the electrodes or positional displacement of the electrodes even if a top face of the layered electrode body is curved.

CITATION LIST

Patent Literature

Patent Literature 1: JP 2012-227131 A
Patent Literature 2: JP 2015-207457 A
Patent Literature 3: JP 2008-108477 A
Patent Literature 4: JP 2005-71784 A

SUMMARY

Technical Problem

According to the technique of Patent Literature 1, the top surface of stacked electrodes is irradiated with light; light reflected by the electrodes is detected; as a result, the position of the electrode on the top is identified; and whether misregistration occurs or not is determined by comparing the identified position with the position of an electrode of the second layer from the top, which has been already identified. When electrodes are automatically checked for misregistration with a layering device, it is easy to carry out an imaging examination on the top surface of equipment as described above in view of the layout. However, when electrodes of the completely same outer shape are layered, misregistration of an electrode that is layered at the top can be detected as a result of checking each layer when the layer is layered, but misregistration may occur in second and subsequent layers from the top due to vibration etc. from the layering. In such a case, it is difficult to detect the misregistration of second and subsequent layers from the top in the examination on the top surface. When side faces of layered electrode elements are checked for misregistration, some layer may be hidden due to, for example, flexure of the electrode elements, which makes the check difficult.

With the foregoing actual circumstances in view, a major object of the present disclosure is to provide a stacked electrode body the whole of which can be checked for misregistration.

Solution to Problem

The present disclosure is provided with, as one means for solving the above problems, a stacked electrode body for an all-solid-state battery, the stacked electrode body including a plurality of electrode bodies that are stacked, the electrode bodies each including a first electrode, a solid electrolyte layer, a second electrode, and a second current collector which are disposed on each of both surfaces of a first current collector in an order mentioned, wherein each of the electrode bodies has a protrusion protruding outward from a side face thereof, and the protrusions have phase differences in a stacking direction.

In the stacked electrode body, each of the electrode bodies may have a phase difference portion including the first electrode, the phase difference portion extending further than a side face of the second electrode, and each of the protrusions may be formed on part of the phase difference portion, the part being part of an extending portion of the phase difference portion further than the side face of the second electrode and protruding further than another part of the extending portion.

The present disclosure is provided with a resin-fixed stacked electrode body formed by fixing the side face of the stacked electrode body with resin. The present disclosure is also provided with an all-solid-state battery having the resin-fixed stacked electrode body.

Advantageous Effects

Each of electrode bodies stacked in a stacked electrode body according to the present disclosure has a protrusion. The protrusions have phase differences in the stacking direction. For this reason, all the protrusions can be checked in the stacking direction. The shapes of the protrusions can identify the position of each electrode body in the stacked electrode body under the check of each protrusion in the stacking direction, which makes it possible to determine misregistration among the electrode bodies. Identification of the position of each electrode body as described above makes it possible to check the entire stacked electrode body for misregistration. Therefore, the entire stacked electrode body according to the present disclosure can be checked for misregistration. In a resin-fixed stacked electrode body and an all-solid-state battery using the stacked electrode body that can be checked for misregistration as described above, misregistration among electrode bodies is suppressed.

BRIEF DESCRIPTION OF DRAWINGS

FIGS. 2A and 2B are cross-sectional views of the stacked electrode body 100 focusing on one electrode body 10.

DESCRIPTION OF EMBODIMENTS

[Stacked Electrode Body]

Figure 1:
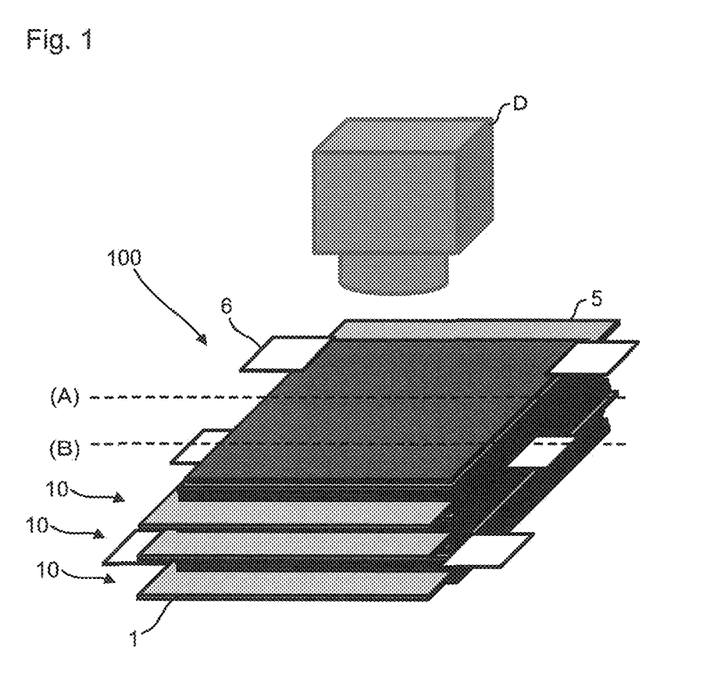
FIG. 1 is a perspective view of a stacked electrode body 100.
Figure 2A:
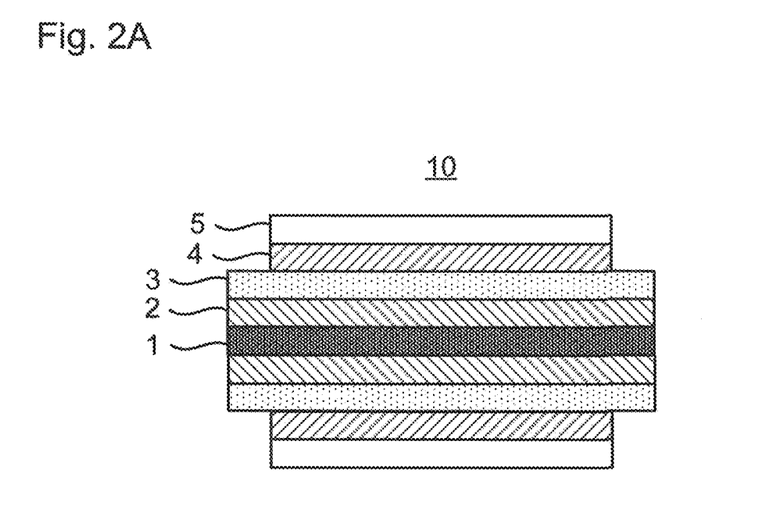
FIG. 2A is a cross-sectional view of part of the electrode body 10 which does not include a protrusion 6.
Figure 2B:
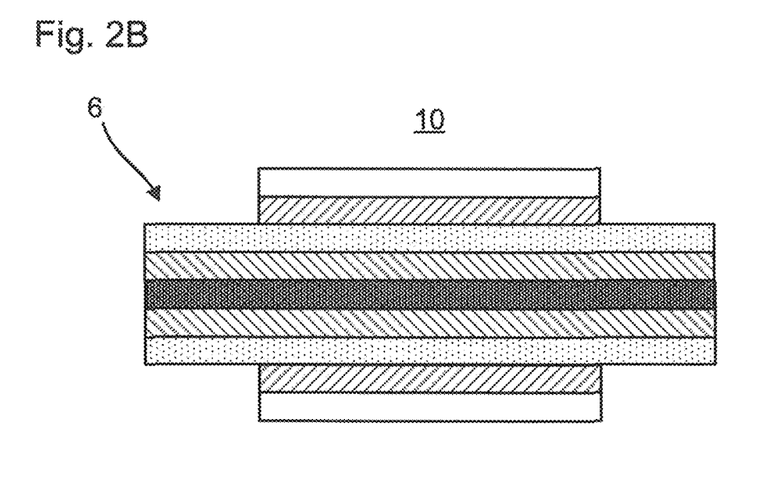
FIG. 2B is a cross-sectional view of part of the electrode body 10 which includes the protrusion 6.

A stacked electrode body according to the present disclosure will be described with reference to a stacked electrode body 100 that is one embodiment. FIG. 1 is a perspective view of the stacked electrode body 100. FIGS. 2A and 2B are cross-sectional views of the stacked electrode body 100 focusing on one electrode body 10. FIG. 2A is a cross-sectional view of the electrode body 10 cut along the line A in FIG. 1 which does not include a protrusion 6. FIG. 2B is a cross-sectional view of the electrode body 10 cut along the line B in FIG. 1 which includes the protrusion 6.

As in FIG. 2A, the stacked electrode body 100 is a stacked electrode body for all-solid-state batteries which includes a plurality of the electrode bodies 10 that are stacked and each include a first electrode 2, a solid electrolyte layer 3, a second electrode 4, and a second current collector 5 which are disposed on each of both surfaces of a first current collector 1 in this order. FIG. 1 shows the stacked electrode body 100 including three stacked electrode bodies 10. The number of the stacked electrode bodies 10 is not particularly limited.

As in FIG. 2A, the electrode body 10 has a phase difference portion including the first electrodes 2. Layers having portions extending further than side faces of the second electrodes 4 (extending portions) are collectively referred to as a phase difference portion. In FIG. 2A, the layers of the first current collector 1, the two first electrodes 2 and the two solid electrolyte layers 3 together (layers held by the solid electrolyte layer 3 on one side and the solid electrolyte layer 3 on the other side in the stacking direction) are collectively referred to as a phase difference portion.

Here, the stacked electrode body 100 (electrode bodies 10) has both end surfaces in the stacking direction and side faces. "Side faces" are faces formed of the outer edges of the stacked electrode body 100 (electrode bodies 10). The phase difference portion may be provided on any of the side faces. When a current collector extends from a side face for connecting with an electrode terminal, the phase difference portion is preferably provided on a side face different from that where the current collector extends because, as described later, a side face provided with the extending portion of the phase difference portion is fixed with resin.

Such a phase difference portion is provided on the electrode body 10 because of short circuit prevention due to Li precipitation. The first electrodes 2 extend on side face sides further than the second electrodes 4 for enhancing effectiveness of the foregoing. In more detail, the area of the first electrodes 2 is designed to be larger than that of the second electrodes, so that the second electrodes 4 are disposed inside the outer edges of the first electrodes 2. In FIG. 2A, the first current collector 1 and the solid electrolyte layers 3 are included in the phase difference portion because adjusted to the shapes of the first electrodes 2.

As in FIGS. 1 and 2B, the electrode body 10 has the protrusion 6 protruding outward from a side face thereof. The protrusion 6 is provided on each of the electrode bodies 10. The protrusions 6 have phase differences in the stacking direction. "The protrusions 6 have phase differences in the stacking direction" means that the protrusions 6 are disposed at positions so as not to overlap each other in the stacking direction. For example, the protrusions 6 may be randomly disposed if not overlapping each other. Or, as in FIG. 1, the protrusions 6 may be disposed from one to the opposite side faces of the stacked electrode body 100 successively.

The protrusions 6 are provided for checking each of the electrode bodies 10 in the stacked electrode body for misregistration. As in FIG. 1, a check (e.g., a known imaging examination) is carried out on the protrusions 6 in the stacking direction so as to identify the positions of the electrode bodies 10, using a known examination device D (e.g., a camera for imaging examination). The positions of all the electrode bodies 10 can be identified according to analysis of the shapes of the protrusions 6 since the protrusions 6 are provided on the electrode bodies 10. Such a check is carried out on each of the protrusions 6 (each of the electrode bodies 10), which makes it possible to check the entire stacked electrode body 100 for misregistration.

The shapes of the protrusions 6 are not particularly limited as long as a check for misregistration can be carried out. As in FIG. 1, the shapes may be rectangles. The protrusions 6 may be provided on any components of the electrode bodies 10, and are preferably provided on the phase difference portions. In this case, as in FIG. 2B, the protrusions 6 are each formed on part of an extending portion of the phase difference portion which protrudes more than another part (that is, part of the extending portion which protrudes more than the other part, which is not the protrusion 6, is the protrusion 6). The length of each of the protrusions in the extending direction and the width direction (direction orthogonal to the extending direction on a side face) is not particularly limited as long as the protrusion is appropriately detectable with the examination device D. The protrusions 6 may be formed all over the phase difference portions in the stacking direction (e.g., between the solid electrolyte layer 3 on one side and the solid electrolyte layer 3 on the other side in the stacking direction). The protrusions 6 are provided on the phase difference portions as described above because of easiness in view of manufacture and in order to suppress deterioration of energy density. Further, each of the protrusions 6 may be provided on only one side face of the electrode body 10, or on both side faces thereof as in FIG. 1.

Patent Literatures 3 and 4 describe such an embodiment that a protrusion is provided on an electrode body. In either Literature, the protrusion is not provided for detecting misregistration.

Hereinafter each element constituting the electrode body 10 will be described.

<First Current Collector 1, Second Current Collector 5>

One of the first current collector 1 and the second current collector 5 is a cathode current collector, and the other is an anode current collector. Here, in the electrode body 10, one sheet may form one layer of each current collector, or a plurality of sheets may be superposed to form one layer thereof. One and another of the electrode bodies 10 may share one layer of any current collector.

As the cathode current collector, metal foil such as SUS, Ni, Cr, Al, Pt, Fe, Ti and Zn may be used. A carbon coating may be disposed on the surface of the cathode current collector. The thickness of the carbon coating ranges, for example, from 1 µm to 20 µm. The material of the carbon coating includes carbon and a binder.

As the anode current collector, metal foil such as SUS, Cu, Ni, Fe, Ti, Co and Zn may be used.

<First Electrode 2, Second Electrode 4>

One of the first electrode 2 and the second electrode 4 is a cathode, and the other is an anode. Specifically, when the first current collector 1 is an anode current collector, the first electrode 2 is an anode, and when the first current collector 1 is a cathode current collector, the first electrode 2 is a cathode. Similarly, when the second current collector 5 is an anode current collector, the second electrode 4 is an anode, and when the second current collector 5 is a cathode current collector, the second electrode 4 is a cathode. Preferably, the first electrode 2 is an anode and the second electrode 4 is a cathode in view of short circuit prevention due to Li precipitation.

The cathode contains at least a cathode active material. As the cathode active material, a known cathode active material that may be used for lithium ion all-solid-state batteries can be given, and examples thereof include lithium cobaltate.

The cathode may contain a solid electrolyte. As the solid electrolyte, a known solid electrolyte may be used, and examples thereof include oxide solid electrolytes and sulfide solid electrolytes. Sulfide solid electrolytes are preferable. As a sulfide solid electrolyte, $Li_2S$—$P_2S_5$ and the like can be given. The ratio of $Li_2S$ to $P_2S_5$ in $Li_2S$—$P_2S_5$ is, for example, within the range such that $Li_2S:P_2S_5=50:50$ to 100:0, which is preferably 50:50 to 90:10. The cathode may contain a binder. As the binder, a known binder may be used, and examples thereof include fluorine containing resins such as polyvinylidene fluoride (PVdF). The cathode may contain a conductive material. As the conductive material, a known conductive material may be used, and examples thereof include acetylene black and vapor grown carbon fibers (VGCF).

The thickness of the cathode is not particularly limited, but is, for example, in the range of 0.1 μm to 1000 μm. The content of each component in the cathode may be the same as in conventional cathodes.

The anode contains at least an anode active material. As the anode active material, a known anode active material that may be used for lithium ion all-solid-state batteries can be given, and examples thereof include known carbon materials such as graphite.

The anode may contain a solid electrolyte. As the solid electrolyte, a known solid electrolyte may be given, and examples thereof include the above described solid electrolytes, which may be used for the cathode. The anode may contain a binder. As the binder, a known binder can be given, and examples thereof include the above described binders, which may be used for the cathode. The anode may contain a conductive material. As the conductive material, a known conductive material can be given, and examples thereof include the above described conductive materials, which may be used for the cathode.

The thickness of the anode is not particularly limited, but is, for example, in the range of 0.1 μm to 1000 μm. The content of each component in the anode may be the same as in conventional anodes.

<Solid Electrolyte Layer 3>

The solid electrolyte layer 3 contains a solid electrolyte. As the solid electrolyte, a known solid electrolyte that may be used for lithium ion all-solid-state batteries can be given, and examples thereof include the above described solid electrolytes, which may be used for the cathode.

The solid electrolyte layer 3 may contain a binder. As the binder, a known binder can be given, and examples thereof include the above described binders, which may be used for the cathode, and butadiene rubber.

The thickness of the solid electrolyte layer 3 is not particularly limited, but is, for example, in the range of 0.1 μm to 1000 μm, and preferably 0.1 μm to 300 μm. The content of each component in the solid electrolyte layer 3 may be the same as in conventional solid electrolyte layers.

[Resin-Fixed Stacked Electrode Body]

Figure 3:
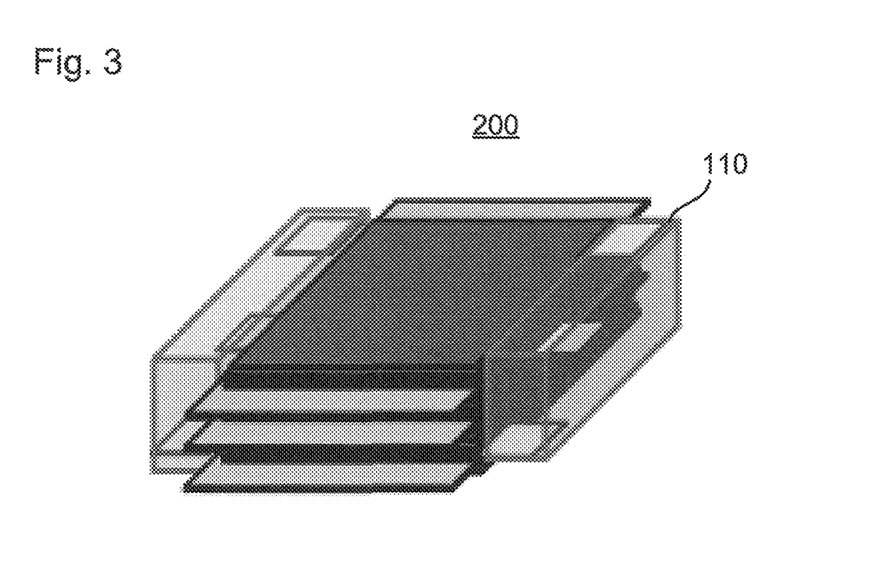
FIG. 3 is a perspective view of a resin-fixed stacked electrode body 200.

A resin-fixed stacked electrode body according to the present disclosure is formed by fixing a side face of the above described stacked electrode body with resin. As one embodiment, FIG. 3 shows a perspective view of a resin-fixed stacked electrode body 200 formed by fixing side faces of the stacked electrode body 100 with a resin 110. As in FIG. 3, the resin 110 is disposed all over side faces of the stacked electrode body 100 in the stacking direction and the longitudinal direction, and fixed. Further, the resin 110 is disposed on both side faces of the stacked electrode body 100. The side faces of the stacked electrode body 100 are fixed with the resin as described above in order to suppress misregistration in stacking and in order to suppress short circuits due to foreign matters formed by powder falling from the end surfaces of the electrodes.

Here, the function of the protrusions 6 in the resin-fixed stacked electrode body 200 will be described. As described above, the protrusions 6 are provided for checking misregistration among the electrode bodies 10. The protrusions 6 also have a function of improving adhesive strength when the side faces of the stacked electrode body 100 are fixed with the resin since increasing the contact area with the resin 110. Thus, the resin-fixed stacked electrode body 200 tends to have the resin 110 having high adhesive strength compared with a case where the resin-fixed stacked electrode body 200 has no protrusion 6. The protrusions 6 are not essential in the resin-fixed stacked electrode body. In other words, when the resin-fixed stacked electrode body 200 is manufactured, the stacked electrode body 100 may be fixed with the resin after the protrusions 6 are cut.

Either a thermosetting resin or a photo-curable resin may be used as the resin 110 used for the resin-fixed stacked electrode body 200. Preferably, a photo-curable resin is used.

[All-Solid-State Battery]

An all-solid-state battery according to the present disclosure has the above described stacked electrode body or resin-fixed stacked electrode body, preferably the resin-fixed stacked electrode body. The all-solid-state battery according to the present disclosure may have a case for housing the stacked electrode body or resin-fixed stacked electrode body, any other necessary terminals, etc.

[Method of Manufacturing Stacked Electrode Body, Resin-Fixed Stacked Electrode Body and all-Solid-State Battery]

A method of manufacturing the stacked electrode body, resin-fixed stacked electrode body, and all-solid-state battery according to the present disclosure will be described. Hereinafter a method of manufacturing the all-solid-state battery will be described as a comprehensive manufacturing method for them. The method of manufacturing the all-solid-state battery includes a preparation step, a layering step, a cutting step, an electrode body stacking step, a resin fixing step, and a housing step.

<Preparation Step>

In the preparation step, a cathode, a solid electrolyte layer, and an anode are each prepared. These may be prepared according to a known method without any particular limitations. For example, when the cathode is prepared, a material to constitute the cathode is mixed with a solvent to form a slurry. Next, the slurry is applied onto a substrate or a cathode current collector and dried. Then, the cathode can be obtained. The solid electrolyte layer and the anode may be prepared according to the same method.

<Layering Step>

The layering step is a step of layering the cathode current collector, the cathode, the solid electrolyte layer, the anode and an anode current collector. In the layering step, for example, the elements of the anode, the solid electrolyte layer, the cathode, and the cathode current collector are layered so as to be arranged on each of both surfaces of the anode current collector in that order. This is the layering order when the first current collector is an anode current collector, the first electrode is an anode, the second current collector is a cathode current collector, and the second electrode is a cathode in the above described electrode body. The layering order is not limited to this. The elements of the cathode, the solid electrolyte layer, the anode, and the anode current collector may be layered so as to be arranged on each of both surfaces of the cathode current collector in that order. This is the layering order when the first current collector is a cathode anode current collector, the first electrode is a cathode, the second current collector is an anode current collector, and the second electrode is an anode in the above described electrode body. Each element may be layered according to a known method.

In the layering step, after the electrode elements are layered, this layered body may be, for example, pressed in order to enhance adhesiveness of each layer. The pressing pressure is, for example, approximately 600 MPa.

<Cutting Step>

Figure 4A:
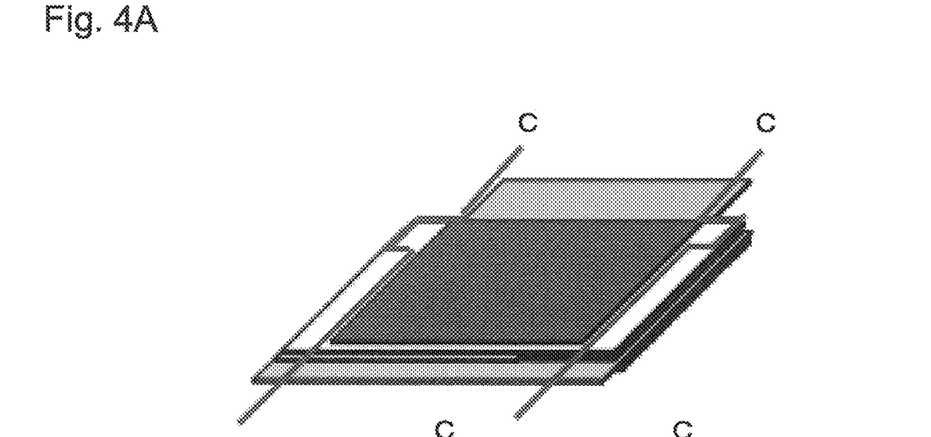
FIGS. 4A to 4C show scenes of a cutting step.
Figures 4B, 4C:
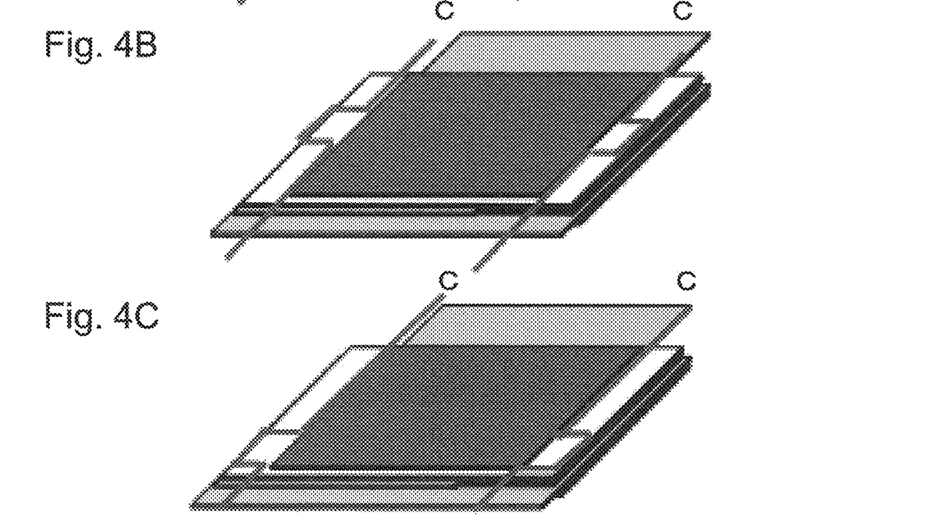

The cutting step is a step of cutting the layered body prepared in the layering step so as to form a protrusion. Each electrode body to constitute the stacked electrode body is prepared by the cutting step. FIGS. 4A to 4C show a portion of the layered body to be cut.

As shown by the lines C in FIGS. 4A to 4C, the phase difference portion of the layered body is cut to form the protrusion on side faces. The positions where the protrusion is formed on the side faces are positions where the protrusions have phase differences in the stacking direction when the electrode bodies are stacked in the following electrode body stacking step. For example, the layered body is cut, so that the protrusion is provided on one side of each of the side faces in FIG. 4A; so that the protrusion is provided at the center of each of the side faces in FIG. 4B; and so that the protrusion is provided on the other side of each of the side faces in FIG. 4C. Such cutting may be performed according to a known method such as laser cutting because laser cutting makes it possible to suppress cracking of electrodes to perform good cutting.

Here, the phase difference portion is cut to form the protrusion in the cutting step because cutting the other portions may lead to decrease in energy density. In other words, it can be said that the phase difference portion is cut to form the protrusion in the cutting step, which can suppress decrease in energy density.

<Electrode Body Stacking Step>

The electrode body stacking step is a step of stacking the prepared electrode bodies. The stacked electrode body is prepared according to the electrode body stacking step. The method for stacking the electrode bodies is not particularly limited, but is, for example, carried out as follows. First, an adhesive is applied to current collectors disposed on the outer sides of the electrode bodies in the stacking direction (second current collectors), and the electrode bodies are stacked. Then the stacked electrode body is, for example, pressed for enhancing the adhesiveness. At this time, the stacked electrode body may be heated and pressed. For example, the pressing pressure is 1 MPa and the temperature is approximately 140° C.

Here, each electrode body is checked for misregistration when the electrode bodies are stacked. The checking method is such that the top surface of the protrusions in the stacking direction are checked to identify the positions of the electrode bodies; and it is determined whether misregistration occurs in the electrode bodies from the relative positional relationship of each electrode body. Such a check may be performed every time when each electrode body is stacked, or after a plurality of the electrode bodies are stacked. The checking method may be performed, for example, according to a known imaging examination.

<Resin Fixing Step>

The resin fixing step is a step of fixing the side faces of the prepared stacked electrode body with resin. The resin-fixed stacked electrode body is prepared according to the resin fixing step. FIGS. 5A to 5D show scenes of the resin fixing step.

Figure 5A:
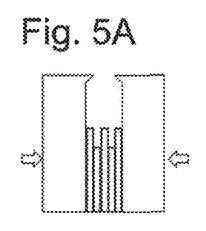
FIGS. 5A to 5D show scenes of a resin fixing step.
Figure 5B:
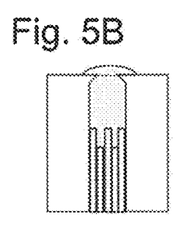
Figure 5C:
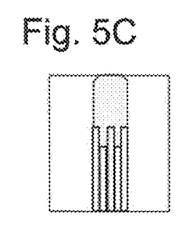
Figure 5D:
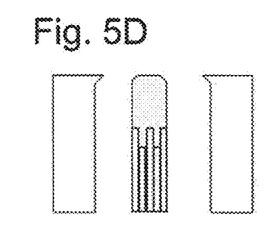

First, as in FIG. 5A, a mold is fixed to the stacked electrode body in such a manner that the mold follows thickness change of the stacked electrode body. At this time, the mold is pressurized as far as the spaces between the electrodes are minimized and the electrodes are not damaged. When the strength of the mold is weaker than the electrode strength, such a pressure that does not lead to deformation of the mold is the upper limit. The material of the mold may be a material having good releasability, and examples thereof include fluororesin. Next, as in FIG. 5B, a space surrounded by the mold and the stacked electrode body on a side face side of the stacked electrode body is filled with the resin. Next, as in FIG. 5C, an excessive portion of the resin with which the mold overflows is scraped off with, for example, a scraper, and the resin is cured. When a thermosetting resin is used, the resin is heated. When a photo-curable resin is used, the resin is irradiated with UV. Finally, as in FIG. 5D, the mold is removed.

Such a resin fixing step may be performed on only one side face of the stacked electrode body, or on both side faces thereof.

<Housing Step>

The housing step is a step of housing the prepared stacked electrode body or resin-fixed stacked electrode body in a predetermined case. The all-solid-state battery can be manufactured according to the housing step. In the housing step, terminals etc. necessary for the stacked electrode body or resin-fixed stacked electrode body may be connected.

As described above, the stacked electrode body, resin-fixed stacked electrode body and all-solid-state battery according to the present disclosure, and the manufacturing methods thereof have been described. According to the present disclosure, each of electrode bodies, which are stacked, has a protrusion. The protrusions have phase differences in the stacking direction. For this reason, all the protrusions can be checked in the stacking direction. The shapes of the protrusions can identify the position of each electrode body in the stacked electrode body under the check of each protrusion in the stacking direction, which makes it possible to determine misregistration among the electrode bodies. Identification of the position of each electrode body as described above makes it possible to check the entire stacked electrode body for misregistration. Therefore, the entire stacked electrode body according to the present disclosure can be checked for misregistration. In a resin-fixed stacked electrode body and an all-solid-state battery using the stacked electrode body that can be checked for misregistration as described above, misregistration among electrode bodies is suppressed.

REFERENCE SIGNS LIST 1 first current collector
2 first electrode 3 solid electrolyte layer
4 second electrode
5 second current collector
6 protrusion
10 electrode body
100 stacked electrode body
110 resin
200 resin-fixed stacked electrode body

What is claimed is:

1. A stacked electrode body for an all-solid-state battery, the stacked electrode body including a plurality of electrode bodies that are stacked, the electrode bodies each including a first electrode, a solid electrolyte layer, a second electrode, and a second current collector which are disposed on each of both surfaces of a first current collector in an order mentioned, wherein
   each of the electrode bodies has a protrusion protruding outward from a side face thereof, and
   the protrusions have phase differences in a stacking direction,
   each of the electrode bodies has an extending portion including the first electrode, the extending portion extending further than a side face of the second electrode, and
   each of the protrusions is formed on part of the extending portion, the protrusion being a portion protruding further than another part of the extending portion, and
   the phase difference portion and the protrusion comprise the first current collector, the first electrode, and the solid electrolyte layer.

2. A resin-fixed stacked electrode body formed by fixing the side face of the stacked electrode body according to claim 1 with resin.

3. An all-solid-state battery having the resin-fixed stacked electrode body according to claim 2.

* * * * *